May 6, 1952      C. H. HOLDER      2,595,255
PRODUCTION OF HYDROCARBONS FROM A GRANULAR SOLID REACTANT
Filed Dec. 26, 1946
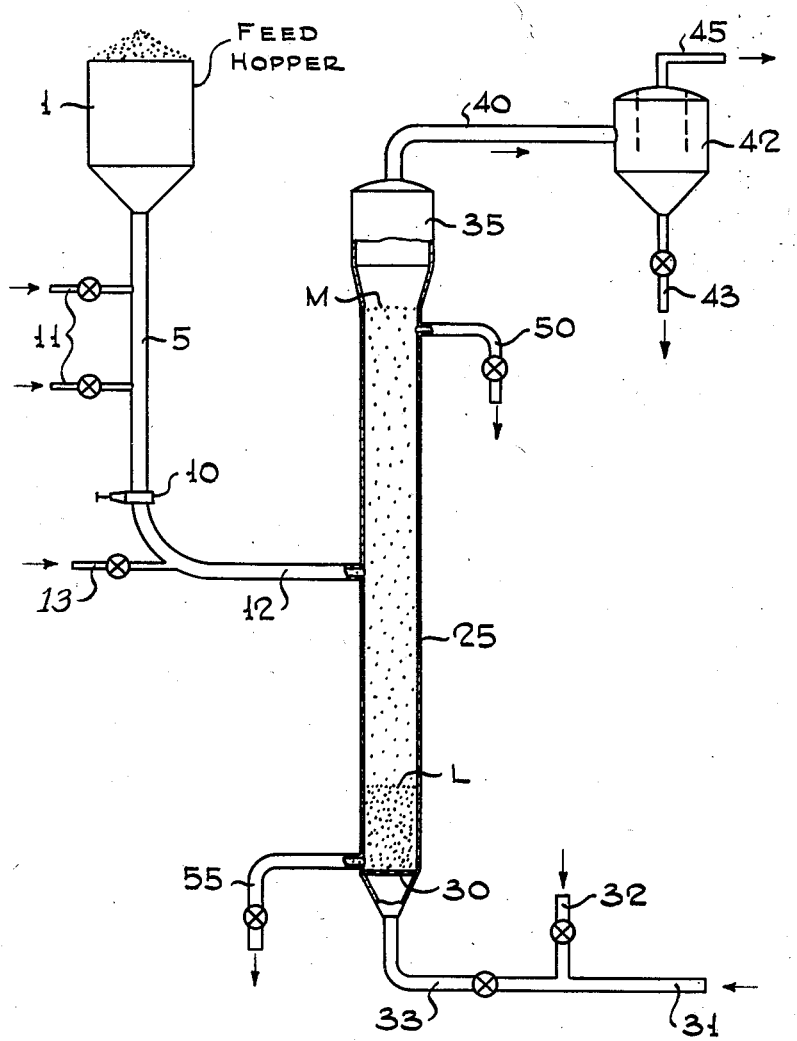
Clinton H. Holder Inventor
By J C Small Attorney Patented May 6, 1952

2,595,255

UNITED STATES PATENT OFFICE 2,595,255

PRODUCTION OF HYDROCARBONS FROM A GRANULAR SOLID REACTANT

Clinton H. Holder, Cranford, N. J., assignor to Standard Oil Development Company, a corporation of Delaware Application December 26, 1946, Serial No. 718,409

7 Claims. (Cl. 260—668)

The present invention is concerned with an improved method and means for reacting a finely-divided solid in suspension with a gaseous fluid until the initial solid substance is fully and uniformly converted to a finer solid product while effecting continuous separation of the reaction products without impeding the reaction and without loss of partially converted solid material.

It is known that some processes have been designed for passing a gaseous fluid through a bed of solid reactant material in the form of relatively large lumps and that other processes have been designed to have a gaseous fluid carry the solid reactant material suspended in the form of a fine dust through a reaction zone. Such processes do not give uniformity of reaction with a rapid flow rate and entail substantial losses of partially converted solid products.

In accordance with the present invention a solid reactant material to be treated is charged principally in a granulated form of considerably larger particle size than the powder or dust to which it is converted, but the initial granulated material is readily suspended or fluidized in a stream of gaseous fluid.

The initial granulated solid material is preferably charged into a vertically-elongated reaction zone at a point where the granulated solid tends to settle into a dense fluidized mass at the bottom of the reaction zone. Above the dense fluidized mass, finer particles of partly converted solid material are carried upwardly into a longer portion of the reaction zone to a point at which the desired amount of reaction is accomplished so that these particles become disintegrated into a very fine powder or dust which is efficiently separated.

The present invention is adapted for use in many types of reactions in which a solid reactant is disintegrated and has been found particularly advantageous when employed in the production of acetylene by the reaction of granulated calcium carbide with steam, also in the production of other hydrocarbon reaction products of acetylene, such as polymers of acetylene and styrene.

The present application is a continuation-in-part of my copending application Serial No. 483,597, filed April 19, 1943, now abandoned.

An object of this invention is to attain uniformity in a process of continuously disintegrating a solid reactant, such as calcium carbide in formation of acetylene under properly controlled conditions of temperature and pressure, the operation being performed expeditiously and more economically than heretofore possible.

Another object is to obtain substantially complete decomposition of a fluidized solid reactant with continuous separation of solid reaction products therefrom.

A more specific object is to produce acetylene by decomposition of fluidized calcium carbide in an environment where the acetylene may be reacted in a nascent state to form other desired hydrocarbon products without the necessity of transporting it to another removed zone, thus obviating difficulties of handling acetylene and undesired reactions during transfer.

One of the features of the present invention involves charging calcium carbide of proper granulated form from a standpipe to a vertically-elongated reaction zone, wherein the calcium carbide granules tend to settle downwardly, countercurrent to an ascending gaseous stream, so that the granulated calcium carbide then forms a dense phase or fluidized solid mass with water vapor-containing gaseous stream that enters a bottom part of the reaction zone. The reactant gaseous stream is made to flow upwardly through the dense phase at a suitable velocity, so as to carry in suspension disintegrated particles of the granulated calcium carbide into a sufficiently large portion of the reaction zone for completing the reaction.

Another feature of the invention resides in the size-classifying action obtained in the elongated reaction zone above the dense fluidized mass of calcium carbide granules. This classifying action is afforded by giving the partly disintegrated particles ample distance of travel and is enhanced by having the charged granulated solids precipitate countercurrently to the suspension. The classifying action is obtained only if the difference in size between the original granulated solid and the finally resulting fines is sufficiently great, otherwise complete mixing occurs and the fluid bed is homogeneous. I have found however that calcium carbide disintegrates to a very fine powder (e. g. 99.5% through a 325 mesh screen) so that by starting with 20–80 mesh calcium carbide the size-classification action is satisfactorily obtained.

The present invention will be explained by reference to the accompanying drawing, in which I have diagrammatically shown a layout indicating a preferred modification of my invention.

Referring to the drawing, 1 represents a feed hopper containing calcium carbide ground to a particle size principally larger than 80 mesh and generally averaging between 20 and 80 mesh. In order to conserve grinding costs, the ground charge of calcium carbide may contain much coarser particles, for instance, up to 1/4" diameter, but preferably about 1/64" to 1/16" in diameter.

The hopper 1 is in open communication with an elongated standpipe 5, which has a slide valve 10 disposed at the lower end thereof. In commercial application, this standpipe may vary in length from 25–75 feet. This standpipe may carry a plurality of taps 11 into which a fluidizing gas, such as flue gas, $CO_2$, $N_2$, natural gas, or the like, is forced and caused to move at a low rate of speed, say 0.1 to 1.0 feet per second. This gas serves to "fluidize" the granulated solid, i. e., to impart to the granulated solid material flow characteristics of a true fluid such as a gas or a liquid.

The standpipe 5 terminates in the bend 12 which projects into a vertical reactor 25.

Steam is discharged into the bend 12 from some suitable source through a pipe 13 and is injected with the fluidized calcium carbide into the reactor 25, preferably at a mid-point thereof and above a foraminous member 30 which may be in the form of an ordinary screen or grid plate.

Steam or water vapor-containing gas from pipe 31 with any admixed reaction gas from pipe 32 is charged through line 33 into the lower extremity of reactor 35 to pass through the grid plate 30. The superficial velocity of the vapor or mixture in the reactor is so controlled as to vary somewhere within the limits of 0.5–5 feet per second. By controlling the velocity of the gaseous fluid passing up through the reactor, the granulated calcium carbide settling downwardly toward the grid 30 can be maintained in a dense fluidized mass extending a definite distance above the grid plate 30. This dense fluidized mass is a highly concentrated mixture of solid in gaseous fluid possessing the flow and "fluostatic" characteristics of water or other true fluid.

By "fluostatic" I mean the property of a material to exert pressure uniformly in all directions. In appearance, the fluid mass of the granulated calcium carbide is in continual motion in all directions, and viewed en masse, the material resembles a boiling liquid.

Due to the motion of the solid particles in this fluid mass complete mixing and uniform temperature results through the mass. This dense mass of granulated calcium carbide assumes a dense phase upper level indicated at L in the drawing, above which the concentration of solid dispersed in gaseous fluid is considerably less. While the dense fluidized mass from grid 30 to upper level L may have a density of about 30–50 pounds per cubic foot, the gaseous fluid carrying a turbulent suspension of partly converted calcium carbide particles above the level L to approximately the location of line 50 may have a density of the order of 10–20 pounds per cubic foot. Above the line 50 the gasiform material may have a low density decreased to the order of 0.02 to 1 pound per cubic foot. This gasiform material is a suspension of very finely-divided conversion products formed by the calcium carbide mixed with a small amount of still finer partially converted calcium carbide entrained by the gaseous fluid.

The upper portion of the reactor 25, that is, the chamber 35, is of greater diameter than the lower portion to form a disengaging space where lowered velocity of gaseous fluid helps prevent entrainment of any particles of excessively large size. An interface therefore exists at approximately position M between the more finely-divided fluidized particles and the gaseous products emerging from the reaction zone. Withdrawal of the majority of the disintegrated solids from the reactor occurs through line 50.

The gaseous fluid carrying in suspension only a small amount of completely converted calcium carbide, i. e., lime particles of the order of 325 mesh or smaller, are withdrawn overhead through line 40 from the top of the reactor 25 and discharged into a solid-gas separating device 42, such as a centrifugal separator or dust separator, where the entrained fines are separated and withdrawn through line 43, while the separated gas substantially free of any solids is passed through line 45 to a recovery system in which the gas and vapor components may be treated in any known manner to recover desired products.

A bottom withdrawal line 55 is provided for removing fluidized granules from the reactor near the grid plate 30. This withdrawal line 55 may be used in controlling the level of dense fluidized mass, but is also advantageously used for removing inert granules or large size residual particles, such as an ash or inert solid material, from the reactor.

In the reaction zone confined within the vertical reactor 25, the contact time may be of the order of 1 to 15 seconds, or longer, depending upon conditions and the nature of the material being treated. The distance from 30 to L, that is, the length of the dense phase fluid mass, is such as to give necessary time of contact for partly disintegrating the granulated calcium carbide as it is undergoing conversion to calcium oxide. The distance of the path of flow through the reactor above the level L is that required for completely disintegrating and converting the more thinly dispersed calcium carbide particles to the extremely fine lime powder which is finally removed from the upper part of the reactor.

Thus far, I have described a preferred type of reactor and the method of continuously feeding granulated calcium carbide and reactant gas to said reactor by means of a standpipe and have described a method of causing the formation of a fluidized mass within the reactor. I have described steps to be taken for confining a dense phase of the fluidized mass to the lower part of the reactor and for confining partly disintegrated solid particles in an upper part of the reactor to prevent escape of the partly converted solid reactant with gaseous fluid withdrawn from upper part of reactor. Up to this point, the method applicable to various kinds of products has been generally described, but as hereinbefore indicated, the temperature and pressure conditions will depend on the particular product desired.

For illustrative purposes it may be assumed that the material withdrawn through line 45 is a gaseous fluid containing benzene vapor formed by acetylene liberated in the reaction between calcium carbide and steam, and this benzene may be used in any manner desired as an intermediate in the production of synthetic rubber or rubber substitutes, such as where the benzene is reacted with acetylene to form styrene.

The temperature conditions within the reactor 25 are controlling on the nature of the product in line 45. Thus, for example, at relatively low temperatures, such as from room temperature to 400° F. and atmospheric pressure, the product in the line 45 will comprise principally acetylene and residual steam, and these components may be separated by fractional condensation. On the other hand, the gaseous product in line 45 may contain quantities of benzene when the temperature in reactor 25 is in the range from 900–1300° F. and the reaction pressure is superatmospheric up to 200 pounds per square inch. Hence, my process is capable of forming benzene in good yields continuously by operating in the temperature range indicated. The benzene yield may range as high as 60% based on the theoretical quantity of acetylene liberated and by maintaining the relatively small particle size of calcium carbide formed by disintegration within the reaction zone until the calcium carbide is completely converted, these yields may be even higher.

The present invention permits the control of reaction temperature by means not previously known or used in the methods of reacting steam with calcium carbide. In other words, with the present invention one may utilize the large amount of heat of reaction associated with the exothermic reaction:

$$CaC_2 + H_2O \rightarrow CaO + C_2H_2$$

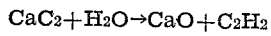

$\Delta H = +14,396$ cals./mol of $CaC_2$ reacted. This liberated heat raises the temperature of the reactants to the described high temperature as in the aforementioned process for making benzene. On the other hand, if the temperature of the reaction zone is controlled at a relatively low level, such as 300–400° F., as in the manufacture of acetylene, a large amount of excess steam or heat exchange equipment has to be present in the reactor to dissipate the heat of reaction. By independent control of the steam entering the bottom of the reactor from line 33, flexible control of the reaction temperature as well as heat economy for the high temperature reaction is achieved.

Assuming that the process is designed to produce benzene from calcium carbide, the final decomposition product of the calcium carbide is either dry calcium oxide or hydrated lime, or both. A fluidized mass of the lime particles may be continuously withdrawn through the drawoff pipe 50 at a point in the upper part of the reactor where the highest concentration of the lime particles occurs. A small amount of lime in a very fine state of subdivision is entrained by the gaseous products withdrawn overhead by line 40 to the separator 42.

Although the bulk density of the CaO and of the hydrated lime particles formed are of the order of 3.4 to 2.34 while the bulk density of the calcium carbide is only about 2.2, the greater fineness of the lime particles has been observed in the upper part of the type of reactor described herein to have substantially higher buoyancy than the granulated calcium carbide feed material or its partially disintegrated product. For instance, it has been observed that the granulated calcium carbide particles larger than 80 mesh concentrate at the bottom of the reactor tube between the grid 39 and the level L so that the fluidized mass below the level L has a definite deep brown appearance. Above the level L in the reactor 25 for a substantial distance, the less dense fluidized mass has a lighter brownish smoke-like appearance, indicating that the particles are partially disintegrated mixed particles of calcium carbide and lime and have a smaller particle size. In a zone above the inlet pipe 12 the fluidized particles become still finer and have the appearance of a whitish smoke.

It has thus been demonstrated that the apparatus arrangement shown and the method of operation described tends to give "fractionation" of the solid particles in the reactor and thus give the desired increase in residence of any unconverted calcium carbide for completion of reaction and efficient separation of the lime, even though the lime particles have a higher bulk density than the calcium carbide.

In spite of the unfavorable relative bulk densities gravitation of the very fine particles of calcium oxide to the top of the reactor occurs owing to the lower average fluidized bed density (about 20 lbs./cu. ft.) which this material has compared to the fluidized bed density (about 40 lbs./cu. ft.) of the coarser 20–80 mesh calcium carbide.

Hence, by operating under the conditions stated, benzene, hydrated lime, and calcium oxide may be produced continuously, expeditiously, and economically in a process which is highly flexible and adapted for variations in temperature, pressure, and contact time as desired.

It will be noted that the main gaseous reactant flowing from line 33 into the bottom of the reactor 25 can be controlled independently of the feed of fluidized granulated solid charged from line 12 into the reactor 25. The granulated solid particles precipitating down through the reactor 25 from the feed inlet 12 become partially reacted as they descend and thus serve to more efficiently distribute the heat of reaction through the reactor.

Fluidizing gas and steam entering the reactor at a mid point, as from inlet 12, also may be employed for increasing the flow of gaseous fluid at the upper part of the reactor without disturbing conditions in the lower part of the reactor wherein it is desired to have most of the reaction occur under optimum conditions.

Acetylene recovered from the overhead gaseous product is recycled in the system to produce more benzene and may be returned for admixture with the gaseous stream entering the reactor from pipe 33 by line 32.

It should be understood that while preferred modifications have been indicated, changes may be made in the nature of the reactants, particle size, and conditions so that many other processes come within the scope of the above description, and these are intended to be included therein as other modifications of the invention.

The production of benzene is illustrative of how my invention permits control of a continuous reaction between solid and gaseous reactants to produce one product in preference to another, for with the same apparatus means described it is possible to withdraw acetylene as the main product from the reactor through line 40, for example, by maintaining the temperature within the reaction zone closer to boiling point of water or thereabout. Furthermore, the reactor may be operated to produce styrene in substantial quantities by charging benzene vapors as an auxiliary fluid reactant through line 32, so that the benzene reacts with the nascent acetylene formed in the lower part of the reaction zone. In this reaction the optimum temperature range in the reactor is 1450–1800° F., and the pressure is preferably subatmospheric. Again, if it is desired to produce butadiene which is an important intermediate in the production of synthetic rubber copolymers, ethylene is charged through line 32 to react with nascent acetylene formed in the reactor 25, and a yield up to about 20% by weight on feed per pass may be obtained at a temperature within the range of 660–850° F., especially in the presence of a catalyst such as molybdic acid which may also be charged to the reactor, preferably in a coarse granulated form so that the catalyst remains in the lower part of the reactor 25. In fact, it is not always necessary to add a catalyst, since calcium oxide has been found to catalyze the reaction and this is formed continuously in the reaction zone. In this reaction, pressures of about 75 pounds per square inch gave good results. Furthermore, in this particular reaction it is preferred to employ extremely short contact times, that is, not over 5 seconds and preferably less than 1 second. By adjusting the inlet level distance between the solid inlet feed point (pipe 12) above the bottom of the reactor 25, an effective control is obtained on the reaction space, because the side feed of fluidizing gas may be used to quench the reaction at its point of entry.

Although calcium carbide has been described as the solid reactant for purposes of illustration, this invention should be construed to include various members of the class of carbides or mixtures of these carbides which yield acetylene or other hydrocarbons on reaction with steam. Examples of other carbides are the carbides of sodium, magnesium, aluminum, and cerium.

Examples of other solids which disintegrate when reacted with other gaseous reactants and which therefore could be processed in a manner similar to that described in the present invention are granulated carbonaceous substances such as coal, coke, charcoal, oil shale, or the like.

Having indicated generally and particularly the nature and purpose of my invention, what is claimed is:

1. In a reaction of a granulated solid with a gaseous reactant, during which the granulated solid is at least partially decomposed and disintegrated into particles of substantially smaller size, the improvement which comprises maintaining a dense fluidized mass of the granulated solid having a top level in the bottom portion of a vertically elongated reaction zone by introducing said gaseous reactant into the bottom of said dense fluidized mass in a quantity sufficient to maintain said dense mass of the granulated solid in a continuously fluidized state, introducing fresh feed of the granulated solid at a feed point above said top level so that this fresh feed passes into and drops countercurrently to an upflowing stream of the gaseous reactant carrying partly decomposed and disintegrated particles of the solid reactant which are continuously arising from the fluidized mass toward and into an upper and longer part of the reaction zone, maintaining the disintegrated solid reactant particles in suspension in the gases in the upper and longer part of the reaction zone until fully decomposed to fine dust particles, and removing said dust particles from a top part of the reaction zone at a point sufficiently remote from the top level of the dense mass and above said feed point to allow substantially complete reaction of the partly decomposed particles of the solid reactant while carried in suspension through the upper part of the elongated reaction zone.

2. In a reaction of a granulated solid with a gaseous reactant, during which the granulated solid is substantially decomposed and disintegrated into particles of substantially smaller size, the improvement which comprises maintaining a dense, fluidized mass of the granulated solid having a top level in the bottom portion of a vertically elongated reaction zone, introducing said gaseous reactant into said reaction zone below said dense, fluidized mass of granulated solid in an amount sufficient to maintain said mass of granulated solid in a continuously fluidized state, gravitating a feed stream of the granulated solid into an upflowing stream of said gaseous reactant at a feed point above said top level of the dense, fluidized mass, carrying partly decomposed and disintegrated particles of the solid reactant which are continuously arising from the fluidized mass of said solid reactant by means of the upflowing gaseous stream toward and into an upper and longer part of the said elongated reaction zone, maintaining the partly decomposed and disintegrated solid reactant particles in suspension in the gases in said upper part of the reaction zone until fully decomposed to fine dust particles no longer capable of undergoing reaction, taking off in a stream of gaseous products from the upper part of said reaction zone the fully decomposed solid reactant particles, separating said gaseous products from fully decomposed solid reactant particles, and discarding said fully decomposed solid reactant particles.

3. In the process of manufacturing hydrocarbons by reaction of granulated solid carbide with steam during which the granulated solid carbide is at least partly decomposed and disintegrated into particles of substantially smaller size, the improvement which comprises maintaining a dense, fluidized mass of the granulated solid carbide having a top level in the bottom portion of a vertically elongated reaction zone, introducing the steam into the reaction zone below said dense, fluidized mass of granulated solid carbide in a quantity sufficient to maintain said mass in a continuously fluidized state, gravitating a feed stream of the granulated solid carbide countercurrently into an upflowing stream of steam from above said top level of the dense, fluidized mass of granulated carbide, carrying partly decomposed and disintegrated particles of solid carbide by means of an upflowing stream of steam toward and into an upper and longer part of the elongated reaction zone, maintaining said disintegrated carbide particles in suspension in the steam in the upper and longer part of the reaction zone until fully decomposed to fine dust particles no longer capable of reaction, and removing said decomposed dust particles in a stream of gaseous products from the upper part of said elongated reaction zone.

4. In a process of reacting granulated calcium carbide with water vapor during which the granulated calcium carbide is decomposed and disintegrated into lime particles of substantially smaller size, the improvement which comprises maintaining a dense, fluidized mass of the granulated calcium carbide having a top level in the bottom of an elongated reaction zone, introducing said water vapor into the reaction zone below said dense, fluidized mass of granulated calcium carbide in a quantity sufficient to maintain said dense mass in a continuously fluidized state, gravitating a feed stream of the granulated calcium carbide into an upflowing stream of water vapor from a point above said top level of the dense, fluidized mass, carrying partly decomposed and disintegrated particles of calcium carbide which are continuously arising from the fluidized mass toward and into an upper and longer part of said elongated reaction zone, maintaining disintegrated particles of calcium carbide in suspension in water vapor in the upper and longer part of the reaction zone until said particles have fully decomposed to fine powdered lime, and removing the powdered lime particles in a stream of gaseous products from the upper part of the reaction zone.

5. The process according to claim 4 in which the solid particles are on the average larger than 80 mesh and the fine lime particles are on the average smaller than 325 mesh.

6. In the manufacture of benzene from granulated calcium carbide and steam, during which the granulated calcium carbide is decomposed and disintegrated into lime particles of substantially smaller size, the improvement which comprises maintaining a dense, fluidized mass of granulated calcium carbide having a top level in the bottom of an elongated reaction zone, introducing the steam into the reaction zone below said dense, fluidized mass of granulated calcium carbide in a quantity sufficient to maintain said dense mass in a continuously fluidized state, gravitating a feed stream of granulated solid calcium carbide countercurrently into an upflowing stream of steam from a point above said top level of the dense, fluidized mass, maintaining a temperature from about 900° F. to 1300° F. and superatmospheric pressure up to 200 lbs. per square inch in said reaction zone whereby benzene and lime are formed as products therein, carrying partly decomposed and disintegrated particles of the granulated calcium carbide arising from the dense, fluidized bed by means of a stream of steam toward and into an upper and longer part of the reaction zone, maintaining disintegrated calcium carbide particles in suspension in the upper part of the reaction zone until fully decomposed to fine particles of powdered lime, withdrawing the lime particles continuously in a stream of reaction products from an upper portion but below the top of said reaction zone, and continuously removing gaseous products containing benzene from the top of said reaction zone.

7. In a reaction of a gaseous reactant with a granular solid reactant that undergoes disintegration into finer particles as it is partially decomposed, the improvement which comprises maintaining a dense fluidized suspension of the granular solid larger on the average than 80 mesh in a bottom portion of a vertically elongated reaction zone up through which a stream of the gaseous reactant is passed under reaction conditions, passing the stream of gaseous reactant up through said reaction zone at a velocity within the limits of 0.5 to 5 feet per second to give said dense fluidized suspension a density of 30 to 50 pounds per cubic foot and to carry partly decomposed and disintegrated particles of the solid into an upper and longer part of the reaction zone wherein the thus disintegrated and partly decomposed particles are maintained in a more dilute suspension at a density of 10 to 20 pounds per cubic foot to undergo further decomposition, introducing the granular solid reactant larger than 80 mesh size into an intermediate part of said upper and longer part of the reaction zone and substantially above the dense fluidized suspension, expanding the up-flowing gaseous stream into an enlarged disengaging zone above an upper level of the more dilute suspension where decomposed finest particles are accumulated, and removing the thus expanded gaseous stream from above the top part of the reaction zone.

CLINTON H. HOLDER.

REFERENCES CITED

The following references are of record in the file of this patent:

UNITED STATES PATENTS

| Number | Name | Date |
| --- | --- | --- |
| 1,857,799 | Winkler | May 10, 1932 |
| 1,984,380 | Odell | Dec. 18, 1934 |
| 2,231,231 | Subkow | Feb. 11, 1941 |
| 2,290,915 | Mesinger | July 28, 1942 |
| 2,387,798 | Kubicek et al. | Oct. 30, 1945 |
| 2,436,595 | Nicholson et al. | Feb. 24, 1948 |

FOREIGN PATENTS

| Number | Country | Date |
| --- | --- | --- |
| 301,975 | Great Britain | Dec. 13, 1928 |
| 346,065 | Germany | Dec. 23, 1921 |